Patented Sept. 29, 1925.

1,555,131

UNITED STATES PATENT OFFICE.

JOHN McGAVACK, OF ELMHURST, NEW YORK, ASSIGNOR TO REVERE RUBBER COMPANY, OF CHELSEA, MASSACHUSETTS, A CORPORATION OF RHODE ISLAND.

PROCESS FOR PREPARING RUBBER-CONTAINING PLASTICS AND PRODUCTS OBTAINED THEREBY.

No Drawing. Application filed October 22, 1923. Serial No. 670,104.

*To all whom it may concern:*

Be it known that I, JOHN McGAVACK, a citizen of the United States, residing at Elmhurst, L. I., county of Queens, State of New York, have invented certain new and useful Improvements in Processes for Preparing Rubber-Containing Plastics and Products Obtained Thereby, of which the following is a full, clear, and exact description.

This invention relates to processes for preparing rubber-containing plastics, being more particularly directed to a process for producing such a plastic formed from rubber, an aldehyde, a phenol, and a halogen; and to the products obtained thereby.

The principal object of the invention is to provide a simple, efficient process for producing plastics of the kind described and to provide a series of useful products having properties similar to both hard rubber and bakelite.

The invention accordingly comprises a process for making rubber-containing plastics which includes causing a reaction to occur between rubber, an aldehyde, a phenol, and a halogen, and recovering the reaction product formed; and the reaction products so formed.

This application is a continuation in part of my copending application Serial No. 649,376, filed July 3, 1923.

As compared with the products recited in my copending application mentioned above, the products of that application are in general somewhat lighter in specific gravity than in the present application and they are also apt to be darker in color. The products of my former application are also somewhat less soluble in organic solvents than those of the present application. The products of the present application are on the other hand somewhat less expensive due partly to the fact that they contain the relatively inexpensive material chlorine to quite a large extent, and this in spite of the fact that both of them are about equally moldable and adapted to take fine impressions of molds employed.

The following represent examples of processes constituting embodiments of the invention:—

*Example 1.*

15 kgs. of pale crêpe rubber are dissolved in 400 kgs. of carbon tetrachloride and chlorine is introduced until the rubber has absorbed twice its weight of chlorine. 30 kgs. of phenol (having the formula $C_6H_5OH$) dissolved in 30 kgs. of 40% formaldehyde water solution are then added to the chlorinated solution of rubber and carbon tetrachloride, and the mass thoroughly mixed. The mixture is then heated with a reflux condenser for 2 hrs. at preferably the boiling point of the solution, whereupon the mass is dumped into boiling water and the excess of solvent, chlorine, hydrochloric acid (formed during the reaction), formaldehyde and phenol are removed. The first water is removed and the product is washed again and again with warm water until it is substantially free from the initial reacting substances and their by-products. The product is then removed and milled on a cold mill to squeeze out excess moisture. It is then pulverized, dried at 95° C. and may then be molded to any desired shape under 3000–4000 lbs. per square inch pressure at approximately 175° C. The physical characteristics of the product thus produced are as follows:

Specific gravity, 1.35–1.4 (molded under 3000–4000 lbs. per square inch); hardness, approximately 3 (mineral scale); transverse tensile, 6000–9000 lbs. per square inch; direct tensile, 3000–4000 lbs. per square inch; preferred range of molding temperature, 165–180° C.; color, light maroon to yellowish red; piercing potential, greater than 17,000 volts per mm.

The substance is practically insoluble in acids and bases. It is opaque, and in view of its high resistance to piercing by high voltage currents is useful as an electrical insulating material. This material on being placed in a highly polished mold produces a substance having a high natural gloss and does not require further polishing. This substance may be machined, drilled, sawed, turned and threaded as desired.

The chemical analysis of products made according to the above process shows a range of constitutents about as follows:

Chlorine, approximately 37.5; carbon, approximately 47.8; hydrogen, approximately 4.6; oxygen, approximately 10.0.

*Example 2.*

As another example of the process 15 kgs. of pale crêpe are dissolved in 400 kgs. of carbon tetrachloride. 30 kgs. of phenol dissolved in 30 kgs. of 40% formaldehyde are added to this rubber and carbon tetrachloride solution and the two are thoroughly mixed. Chlorine gas is then bubbled through the mass until the solid separates. The whole mass is then dumped into a mass of boiling water, and the washing and drying are carried on as indicated in the first example. This product is preferably molded under 3000–4000 lbs. per square inch pressure at approximately 140° C. The quantity of chlorine absorbed according to the above process is approximately equal in weight to that of the rubber employed.

The following are the physical properties of the products made in accordance with the above process:

Specific gravity, 1.17–1.25 (under 3000–4000 lbs. per square inch in the molding pressure); hardness, approximately 3.0 (mineral scale); transverse tensile, 8000–12000 lbs. per square inch; direct tensile, 4000–5000 lbs. per square inch; range of molding temp., 135–140° C.; color, orange brown; piercing potential, approx. 15000–17000 volts per mm.

The chemical analysis of the compositions obtained in accordance with this procedure show the following constituents in approximately the quantities indicated:

Chlorine, approximately 20.0; carbon, approximately 62.0; hydrogen, approximately 5.5; oxygen, approximately 12.5.

*Example 3.*

As another example of the process 40 kgs. of latex having a solid rubber content of 35% approximately is added to 500 kgs. of carbon tetrachloride and 15 kgs. of phenol dissolved in 15 kgs. of 40% formaldehyde solution. The substances are thoroughly mixed and placed in a container and chlorine gas is bubbled through the mass until separation occurs. The material is washed and dried as indicated in Example 1. The material so produced is similar in its characteristics to the material produced in accordance with Example 2.

*Example 4.*

As another example of the process 15 kgs. of rubber dissolved in 400 kgs. of carbon tetrachloride are chlorinated in the usual manner until approximately twice as much chlorine is absorbed as the original amount of rubber. To this solution is then added 30 kgs. of phenol previously dissolved in 30 kgs. of 40% formaldehyde. Chlorine is again introduced and a gradual change in color is observed. This consists of going from a white emulsion to a reddish brown emulsion. Considerable heat is generated from this reaction. The material is then poured into boiling water by which means excess chlorine, carbon tetrachloride, phenol, formaldehyde and by-products are removed. Washing, drying and grinding are carried out as in previous examples. The following is the range of physical characteristic found in connection with the products obtained by the above process:

Specific gravity, 1.3–1.4; hardness, 3.0 (mineral scale); transverse tensile, 4000–8000 lbs. per square inch; straight tensile, 2500–3500; range of molding temperature, 140–150° C.; color, light yellow to dark yellow.

Any of the processes mentioned in Examples 1 to 4 may be employed with the use of filling materials. The following example will serve to illustrate the use of such material:

*Example 5.*

Using Example 1, after the material has been prepared, that is washed, pulverized, and still remains in water suspension, and just before drying, fillers may be added. For instance in Example 1, 30 kgs. of wood flour are added and are thoroughly mixed in a paint mill. After this mixture the material is dried and molding may be carried out as under 3,000–4,000 lbs. pressure at 175° C. Instead of wood flour, such substances as casein, iron oxide, asbestos, soapstone, mica, silica, hydrated lime, magnesium carbonate may be employed. Any one of these substances used in the same proportion as given for wood flour in the above example will produce desirable products. Other proportions than specified for these ingredients may be employed.

*Example 6.*

15 kgs. of finely pulverized chlorinated rubber, where the ratio of chlorine to rubber is approximately 2 to 1 are mixed in a paint mill with 15 kgs. of the pulverized condensation product of phenol and formaldehyde or their homologues. Water is added as a dispersing medium. This material after thorough mixing may be dried at 90° C. and then can be molded at a temperature varying from 160–175° C.

It is pointed out that Examples 1, 5 and 6 disclose the use of twice as much chlorine by weight as rubber and that Examples 2 and 3 indicate the use of equal quantities. It will be obvious that proportions of chlorine intermediate 1 and 2 times the weight of the rubber may be used or more or less quantities of the chlorine may be employed. The utilization of more than twice as much chlorine as rubber using the process of Examples 1, 5 and 6, does not seem to produce any more desirable product than that employing the proportions specified in this example. This is probably due to the fact that the rubber molecule is saturated with chlorine where twice as much chlorine as rubber is used and the addition of further chlorine has accordingly practically little or no effect. In Example 4 less amounts of chlorine than twice the weight of the rubber may be employed or more than twice as much chlorine by weight as rubber may be employed. In this instance apparently the chlorine combines not only with rubber but with the phenol present to produce a chlorinated phenol and this phenol probably aids in lowering the temperature for molding. It will be observed in this example that the temperature for molding is approximately 140° C. as compared with Example 1 where the temperature is about 175° C. It will be understood that other phenols may be employed than that having the formula $C_6H_5OH$, namely the homologues with this material such as cresol, etc. It will also be understood that other aldehydes than formaldehyde may be employed, such as furfural, acetaldehyde, butyl aldehyde, and aldehyde ammonia. Instead of carbon tetrachloride various other solvents may be used such as chloroform, benzol, solvent naphtha and the like.

In connection with the quantity of phenol which may be satisfactorily employed in the examples, it is pointed out that the maximum effect of the presence of phenol seems to evidence itself when the proportions of phenol to rubber are as about 3 to 1. A larger or smaller proportion may be employed of course but the change in effect is not so noticeable as when the proportions of phenol to rubber range from about 1 to 1 up to 3 to 1. The quantity of formaldehyde will vary according to the quantity of phenol employed, the proportions being maintained preferably at about 1 to 1.

The materials produced in accordance with the above procedure find application in the production of battery jars, knife handles, pipe stems, electric insulation, and in general may be employed for similar purposes to those for which bakelite and hard rubber are used. The processes mentioned are inexpensive, simple and employ inexpensive raw materials. As compared with bakelite the material is practically free from the odor of phenol. In the molding process in the case of bakelite it is necessary to heat to a relatively high temperature and then cool to a relatively low temperature before opening the mold in order to avoid "blowing." By the term "blowing" is meant the liberation of gases which are apt to cause blisters on the surface of the material. In the present invention it is possible to mold at comparatively lower temperature and relatively little care need be taken to cool the mold before opening.

As many apparently widely different embodiments of this invention may be made without departing from the spirit thereof, it will be understood that I do not intend to limit myself to the specific embodiment herein set forth except as indicated in the appended claims.

Having thus described my invention, what I claim and desire to protect by Letters Patent is:

1. A process for making rubber combinations which comprises treating rubber with a phenol, an aldehyde, and a halogen, and recovering the reaction product formed.

2. A process for making rubber combinations which comprises chlorinating rubber, adding a phenol and formaldehyde thereto, heating the mixture to cause a reaction to take place, and recovering the reaction product.

3. A process for making rubber combinations which comprises combining with rubber twice its weight of chlorine, adding phenol and formaldehyde to the chlorinated mass, heating the combination, and recovering the reaction product.

4. A process for making rubber combinations which comprises combining chlorine with a solution of rubber until the rubber has taken up twice its weight of chlorine, adding to the chlorinated solution a solution of formaldehyde and phenol ($C_6H_6O$), heating the mass to cause a reaction to occur, and recovering the reaction product.

5. A process for making rubber combinations which comprises dissolving rubber in an organic solvent in the proportion of about 15 kgs. of rubber to 400 kgs. of solvent, introducing chlorine into the solution until the rubber combines with about twice its weight of chlorine, dissolving phenol ($C_6H_6O$) in formaldehyde in the proportion of about 30 kgs. of phenol to 30 kgs. of 40% formaldehyde, adding the mixture of phenol and formaldehyde to the chlorinated rubber solution, heating the combination for 1 to 2 hrs. at about the boiling point of the solvent thereby forming a reaction product, and recovering the reaction product.

6. A process for making rubber combinations which comprises combining chlorine with rubber in solution until the rubber has absorbed approximately twice its weight of chlorine, adding phenol and formaldehyde to the chlorinated solution, and passing more chlorine gas into the combination so formed, thereby forming a reaction product, and recovering the reaction product.

7. A process for making rubber combinations which comprises combining rubber, phenol, formaldehyde, chlorine and a filler, and recovering the combination.

8. A process for making rubber combinations which comprises combining rubber, phenol, formaldehyde, chlorine and wood flour, and recovering the combination.

9. A process for making rubber combinations which comprises combining chlorinated rubber with a phenol formaldehyde condensation product in the presence of an organic solvent, and recovering the mass from the solvent.

10. As a new compound the product of the reaction of rubber, an aldehyde and a phenol and a halogen.

11. As a new compound the product of the reaction of rubber, an aldehyde, a phenol and chlorine in the presence of an organic solvent.

12. As a new compound chlorinated rubber treated with a phenol and an aldehyde.

13. As a new compound chlorinated rubber combined with a phenol and formaldehyde, the rubber being combined with twice its weight of chlorine.

14. As a new compound chlorinated rubber combined with formaldehyde and phenol ($C_6H_6O$), the rubber being combined with twice its weight of chlorine.

15. As a new compound, the reaction product recovered from a chlorinated mixture of rubber, phenol and formaldehyde.

16. A product having a light maroon to a yellowish red color having a specific gravity of 1.35–1.4, hardness approximately 3 (mineral scale), transverse tensile 6000–9000 lbs. per square inch, direct tensile 3000–4000, preferred range of molding temperature 165–180° C., piercing potential greater than 17,000 volts per mm., and a proximate analysis as follows: chlorine approximately 37.5, carbon approximately 47.8, hydrogen approximately 4.6, oxygen 10.0.

Signed at New York, New York, this 18th day of October, 1923.

JOHN McGAVACK.